United States Patent Office 3,772,217
Patented Nov. 13, 1973

3,772,217
CARBODIIMIDE FOAMS PREPARED FROM AMINE-DERIVED ISOCYANATE-TERMINATED QUASI-PREPOLYMERS
Peter T. Kan, Plymouth, Moses Cenker, Trenton, and T. V. Lakshmi Narayan, Riverview, Mich., assignors to BASF Wyandotte Corporation, Wyandotte, Mich.
No Drawing. Filed Feb. 7, 1972, Ser. No. 224,304
Int. Cl. C08g 33/02, 22/02, 53/08
U.S. Cl. 260—2.5 BF                               5 Claims

ABSTRACT OF THE DISCLOSURE

Rigid foams characterized by carbodiimide linkages having minor amounts of urea and biuret groups incorporated therewith exhibit reduced brittleness and improved flexibility without any loss of flame retardancy when prepared from amine-derived isocyanate-terminated quasi-prepolymers.

BACKGROUND OF THE INVENTION

(1) Field of the invention

The present invention pertains to rigid cellular foams characterized by carbodiimide linkages. More specifically, the present invention pertains to rigid cellular foams characterized by carbodiimide linkages having reduced brittleness, improved flexibility and no impairment of flame properties, the foam being prepared by the catalytic condensation of an amine-derived isocyanate-terminated quasi-prepolymer.

(2) Prior art

The preparation of rigid cellular foams characterized by carbodiimide linkages by the catalytic condensation of organic polyisocyanate has been described heretofore. See for example, copending U.S. patent application Ser. No. 5,985, filed Jan. 26, 1970, now U.S. Pat. No. 3,645,923; Ser. No. 157,025, filed Jan. 25, 1971, now U.S. Pat. No. 3,723,366; Ser. No. 118,994, filed Feb. 25, 1971; and Ser. No. 169,470, filed Aug. 5, 1971, now U.S. Pat. No. 3,717,596.

Essentially these applications teach the preparation of these foams by the catalytic condensation, at room temperature and above, of an organic polyisocyanate in the presence of either a 2,4,6-tris(dialkanolamino)-s-triazine or 2,4,6-tris(methylethanolamino)-s-triazine primary catalyst which can be used, alone, or conjointly with an isocyanate trimerization catalyst selected from the group of (1) 1,3,5-tris(dialkylaminoalkyl)-s-hexahydrotriazine, (2) 2,4,6-tris(dimethylaminomethyl)phenol, (3) o-, p- or a mixture of o- and p- dimethylaminomethylphenol, or (4) an organotin compound.

Other copending applications teach the enhancement of the physical properties of these foams by the use of auxiliary blowing agents (Ser. No. 169,526, filed Aug. 5, 1971, now abandoned), acrylonitrile graft polymers (Ser. No. 185,910, filed Oct. 1, 1971), and the like. The disclosures of all of the hereinabove referred to copending applications are incorporated by reference.

The resulting foams of the copending applications are rigid plastics characterized by carbodiimide linkages, i.e. the dominant recurring group in the foam is carbodiimide, the foams further including isocyanurate groups and free residual isocyanate groups.

The present invention seeks to improve upon these foams by reducing the brittleness thereof, by imparting some flexibility to the foams, but without impairing the excellent flame characteristics of the foams.

SUMMARY OF THE INVENTION

In accordance with the present invention, rigid cellular foams characterized by carbodiimide linkages are prepared by the catalytic condensation of an amine-derived isocyanate-terminated quasi-prepolymer to thereby introduce urea and biuret groups into the foam which results in foams of reduced brittleness and greater flexibility without retarding the flame characterisitics of the foam.

The quasi-prepolymer can be used as the sole polyisocyanate reactant or in admixture with further polyisocyanate in the preparation of the foams.

For a more comprehensive consideration of the present invention, reference is made to the following detailed descriptions and examples thereof.

DESCRIPTION OF THE PREFERRED EMBODIMENTS

The present invention is based on the discovery that if minor amounts of urea and biuret groups are introduced into rigid cellular foams characterized by carbodiimide linkages the resulting products exhibit reduced brittleness and increased flexibility without any impairment of flame characteristics. To achieve this discovery, amine-derived organic polyisocyanate, i.e. amine-derived isocyanate-terminated quasi-prepolymers are used as the isocyanate reactant for the preparation of these rigid foams.

For purposes of brevity, the foams prepared in accordance herewith will be referred to as carbodiimide foams. It is to be understood, though, that these foams which are dominated by carbodiimide linkages further include, besides the urea and biuret considered herein, isocyanurate groups and free residual isocyanate, although it is the carbodiimide linkages which, as noted, are dominant in the foam and which impart the excellent flame characteristics thereto.

The introduction of urea and biuret groups into carbodiimide foams has not heretofore been disclosed or suggested in the art to which the present invention pertains. Further, the use of amine-derived isocyanate-terminated quasi-prepolymers or amine-derived organic polyisocyanate to achieve this desired effect has not heretofore been taught or disclosed. The prior art has only taught the use of amine-derived organic polyisocyanates in the preparation of urethane elastomers, urethane sealants, urethane foams and the like. See for example, U.S. Pat. Nos. 3,517,039; 3,462,470; 3,441,588; and British 1,153,169. The preparation of amine-derived organic polyisocyanates has also been described, see U.S. Pats. 3,392,183 and 3,411,588.

The amine-derived isocyanate-terminated quasi-prepolymers used in the practice of the present invention are generally prepared by reacting, with vigorous agitation, less than stoichiometric quantities of an amine with an organic polyisocyanate at a temperature ranging from about 25° to 200° C., preferably, 30° to 15° C. for a period of from about ten minutes to five hours, preferably one hour to three hours, and thereafter cooling the reaction product to about room temperature. Generally, from about one-tenth to ten parts by weight of amine per one hundred parts by weight of isocyanate is employed in the preparation of the quasi-prepolymer. Preferably, from about one to five parts by weight of amine per one hundred parts by weight of isocyanate is used.

The amine which can be used to prepare the quasi-prepolymer can be any aromatic or aliphatic, primary or secondary polyamine, as well as mixtures of such amines. The aliphatic amines may be either linear or alicyclic. Also, the amines may contain inert substituents, such as, halogen, alkyl and the like.

Representative linear aliphatic amines, include, for example, ethylene diamine, 1,3-propylene diamine, 1,4-butylene diamine, 1,3-butylene diamine, diethylenetriamine, triethylenetetramine, hexamethylene diamine, and the like. Examples of suitable alicyclic amines include piperazine, 2-methylpiperazine, and the like.

Useful aromatic amines, include methylene dianiline, polyarylpolyalkylene polyamine (crude methylene dianiline), methylene bis(2-chloroaniline), p-aminoaniline, 1,5-diaminonaphthalene, 2,4 or 2,6-diamino toluene and the like.

In fact any aromatic or aliphatic, primary or secondary polyamine, can be used in the preparation of the quasi-prepolymer.

The organic polyisocyanates useful in preparing the quasi-prepolymer can be represented by the formula:

$$R(NCO)_z$$

wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4′,4″-triphenylmethylene triisocyanate, 2,4,6-toluene triisocyanate; the aromatic tetraisocyanates, such as 4,4′-dimethyldiphenylmethane - 2,2′,5,5′-tetraisocyanate, and the like; aralkyl polyisocyanates, such as xylylene diisocyanate; aliphatic polyisocyanates, such as hexamethylene-1,6-diisocyanate, lysine diisocyanate methylester and the like, and mixtures thereof. Other useful organic polyisocyanates include:

polymethylene polyphenylisocyanate,
hydrogenated methylene diphenylisocyanate,
m-phenylene diisocyanate,
naphthylene-1,5-diisocyanate,
1-methoxyphenyl-2,4-diisocyanate,
diphenylmethane-4,4′-diisocyanate,
4,4′-biphenylene diisocyanate,
3,3′-dimethoxy-4,4′-biphenyl diisocyanate,
3,3′-dimethyl-4,4′-biphenyl diisocyanate, and
3,3′-dimethyldiphenylmethane-4,4′-diisocyanate, and the like.

These polyisocyanates are prepared by conventional methods known in the art such as the phosgenation of the corresponding organic amine.

Still another class of organic polyisocyanates useful in preparing the amine-derived isocyanate-terminated quasi-prepolymers are other "quasi-prepolymers." These other "quasi-prepolymers" are prepared by reacting an excess of organic polyisocyanate or mixtures thereof with a minor amount of an active hydrogen containing compound as determined by the well-known Zerewitinoff test, as described by Kohler in J. Am. Chem. Soc., 49, 3181 (1927). These compounds and their methods of preparation are well known in the art. The use of any one specific active hydrogen compound is not critical hereto, rather, any such compound that can be used to prepare a quasi-prepolymer can be employed herein. These other quasi-prepolymers are prepared by reacting an organic polyisocyanate with less than a stoichiometric amount, based on the weight of the polyisocyanate, of the active hydrogen-containing compound.

Suitable active hydrogen-containing groups as determined by the Zerewitinoff method which are reactive with an isocyanate group to form another quasi-prepolymer include —OH, —COOH and —SH. Examples of suitable types of organic compounds containing at least two active hydrogen-containing groups which are reactive with an isocyanate group are hydroxyl-containing polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; as well as mixtures thereof. Compounds which contain two or more different groups within the above-defined classes may also be used such as, for example, compounds which contain one —SH group and one —OH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, butyl-α-ethyl-glutaric acid, α,β-diethyl-succinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-di(4-hydroxyphenyl) propane, commonly known as Bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol 7, pp. 257–262, published by Interscience Publishers, Inc. (1957) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1, 4-dithiol; and alkyne thiols such as 3-hexyne-1, 6-dithiol.

Other compounds which do not necessarily fit within any of the previously set forth classes of compounds which are quite suitable in the production of these other quasi-prepolymer compounds include the hydroxy-terminated polyurethane polymers such as a hydroxy-terminated polymer made by reacting an isocyanate with several moles of an alkylene glycol.

It should be noted that although these other "quasi-prepolymers" are useful in preparing the present quasi-prepolymer herein they are not optimally preferred since they may somewhat detract from the flame characteristics of the carbodiimide foams, if the total amount of actvie hydrogen-containing compound used to prepare the other "quasi-prepolymer" is too great.

Thus, within the broad class of useful organic polyisocyanates for amine-derived isocyanate-terminated quasi-prepolymer preparation, it is preferred to employ organic polyisocyanate selected from the group of (1) an 80:20 weight mixture of 2,4- and 2,6-toluene diisocyanate, (2) crude toluene diisocyanate, (3) methylene, diphenyldiisocyanate, (4) crude methylene diphenyldiisocyanate and (5) mixtures thereof.

As noted hereinbefore, the amine-derived isocyanate-terminated quasi-prepolymer is prepared by reacting the amine and organic polyisocyanate with vigorous agitation and at a temperature of from about 30° C. to 150° C.

The reaction between the amine and the isocyanate provides for the formation of both urea groups and biuret groups within the quasi-prepolymer.

The quasi-prepolymers contemplated herein will generally contain from about 20 to 40% by weight of free isocyanate groups, these groups being available for the hereinafter described condensation reaction which provides the foams of the present invention. Also, these prepolymers will range from either mobile fluids to gel-like viscous materials, depending on the amount of polyamine used, the type of isocyanate used and the reaction conditions employed.

In accordance with the present invention, the above-defined amine-derived isocyanate-terminated quasi-prepolymers are used as the isocyanate reactant for the preparation of carbodiimide foams. Foams thus prepared have introduced thereto minor amounts of urea and biuret groups which provides carbodiimide foams of reduced brittleness and increased flexibility without any loss of flame properties. Generally, on a mole basis, the carbodiimide foams will contain from about one to fiive percent of urea and biuret groups.

The preparation of the foam, per se, is achieved in accordance with any of the hereinbefore described procedures as defined in the copending applications.

In preparing the foam, the amine-derived isocyanate-terminated quasi-prepolymer is used in an amount ranging from about ten to one hundred parts by weight per part by weight of catalyst and, preferably, from about twenty to fifty parts by weight of quasi-prepolymer per part by weight of catalyst.

It is to be further understood that the amine-derived isocyanate-terminated quasi-prepolymer can be used alone, or in admixture with other isocyanates such as those disclosed as being useful in the preparation of the prepolymer, itself. A mixture of quasi-prepolymer and other isocyanate can be prepared in any proportion so long as the total amine content does not fall below the 0.1 part by weight of amine per 100 parts by weight of isocyanate referred to above.

Following are examples embodying the principles of the present invention. In the examples, which are not to be construed as limitative of the invention, all parts are by weight absent indications to the contrary. Further, in the examples showing preparation of the foam, plasticizers, surfactants, auxiliary blowing agents and the like, where used, were used as a blend with the catalyst in a manner described in the above-noted copending U.S. Ser. No. 169,470, filed Aug. 5, 1971, now U.S. Pat. No. 3,717,596.

EXAMPLES 1–40

A series of amine-derived isocyanate-terminated quasi-prepolymers were prepared by the following procedure:

To a reaction vessel equipped with heating means, thermometric and agitation means was charged a quantity of organic polyisocyanate. Then with vigorous agitation the amine was added thereto. While continuing the agitation, the vessel was heated to the desired temperature and was maintained thereat for a sufficient period of time to insure complete reaction of the amine groups with isocyanate. After the reaction was completed, the product was then allowed to cool to room temperature.

Table I, presented hereinafter, sets forth the ingredients used to prepare the amine-derived isocyanate-terminated quasi-prepolymers and the amounts thereof as well as the reaction temperatures and times and the free isocyanate content of the recovered quasi-prepolymer.

TABLE I.—AMINE-DERIVED ISOCYANATE-TERMINATED QUASI-PREPOLYMER

| Example | Isocyanate reactant, p.b.w. | | Amine reactant, p.b.w. | | | | | Reaction temp., °C./hr. | Percent NCO |
|---|---|---|---|---|---|---|---|---|---|
| | TDI [a] | MDI [b] | MOCA [c] | MDA [d] | Crude MDA [e] | 2-MP [f] | HMDA [g] | | |
| 1 | 50 | 50 | 1 | | | | | 50/0.2 | |
| 2 | 50 | 50 | 2 | | | | | 50/0.5 | 38.1 |
| 3 | 25 | 75 | 2 | | | | | 55/0.3 | 33.8 |
| 4 | 25 | 75 | | 1 | | | | 80/1.0 | 33.9 |
| 5 | 25 | 75 | | 2 | | | | 80/1.5 | 33.2 |
| 6 | 25 | 75 | | 5 | | | | 55/1.0 | 32.7 |
| 7 | 25 | 75 | | 1 | | | | 40/1.0 | 34.1 |
| 8 | 25 | 75 | | 2 | | | | 40/2.0 | 33.5 |
| 9 | 25 | 75 | | 5 | | | | 60/1.0 | 32.3 |
| 10 | 50 | 50 | | | 1 | | | 36/3.0 | 38.2 |
| 11 | 50 | 50 | | | 2 | | | 36/2.3 | 38.0 |
| 12 | 50 | 50 | | | 5 | | | 38/2.0 | 36.5 |
| 13 | 25 | 75 | | | 1 | | | 30/3.8 | 34.0 |
| 14 | 25 | 75 | | | 2 | | | 30/3.0 | 33.4 |
| 15 | 25 | 75 | | | 5 | | | 35/2.0 | 32.4 |
| 16 | 50 | 50 | | | | 1 | | 65–86/1.6 | 37.9 |
| 17 | 50 | 50 | | | | 2 | | 91–95/1.7 | 36.4 |
| 18 | 50 | 50 | | | | 5 | | 92–97/2.0 | 30.4 |
| 19 | 25 | 75 | | | | 1 | | 90–101/2.0 | 33.5 |
| 20 | 25 | 75 | | | | 2 | | 47–150/3.0 | 29.8 |
| 21 | 25 | 75 | | | | 5 | | 90–100/2.0 | 28.1 |
| 22 | 50 | 50 | | | | | 1 | 91–104/2.0 | 38.3 |
| 23 | 50 | 50 | | | | | 2 | 91–100/2.0 | 36.9 |
| 24 | 50 | 50 | | | | | 5 | 106–111/2.0 | 32.5 |
| 25 | 25 | 75 | | | | | 1 | 76–169/1.5 | 31.5 |

See footnotes at end of table.

TABLE I—Continued

| Example | Isocyanate reactant, p.b.w. | | Amine reactant, p.b.w. | | | | | Reaction temp., °C./hr. | Percent NCO |
|---|---|---|---|---|---|---|---|---|---|
| | TDI[a] | MDI[b] | MOCA[c] | MDA[d] | Crude MDA[e] | 2-MP[f] | HMDA[g] | | |
| 26 | 25 | 75 | | | | | 2 | 61–145/2.75 | 30.4 |
| 27 | 25 | 75 | | | | | 5 | 59–184/5.0 | 24.2 |
| 28 | 40 | 60 | | | 3 | | | 43–50/1.0 | 35.7 |
| 29 | 30 | 70 | | | 1 | | | 54–61/5.0 | 35.0 |
| 30 | 30 | 70 | | | 2 | | | 48–60/4.0 | 34.7 |
| 31 | 30 | 70 | | | 3 | | | 41–50/1.75 | 34.1 |
| 32 | 20 | 80 | | | 1 | | | 42–48/3.0 | 31.3 |
| 33 | 20 | 80 | | | 2 | | | 46–55/3.0 | 31.1 |
| 34 | 20 | 80 | | | 3 | | | 60–62/3.0 | 30.7 |
| 35 | 10 | 90 | | | 1 | | | 42–57/1.5 | 31.4 |
| 36 | 10 | 90 | | | 2 | | | 60–78/2.0 | 30.4 |
| 37 | 10 | 90 | | | 3 | | | 41–58/2.0 | 30.4 |
| 38 | | 100 | | | 1 | | | 50–65/1.5 | 29.4 |
| 39 | | 100 | | | 2 | | | 54–60/1.0 | 28.3 |
| 40 | | 100 | | | 3 | | | 55–60/2.0 | 27.1 |

[a] 80:20 weight mixture of 2,4- and 2,6-toluene diisocyanate.
[b] Crude methylene diphenyldiisocyanate.
[c] Methylene bis(2-chloroaniline).
[d] Methylene dianiline.
[e] Crude methylene dianiline.
[f] 2-methylpiperazine.
[g] Hexamethylene diamine.

EXAMPLES 41–67

These examples illustrate the preparation of carbodiimide foams from the amine-derived isocyanate-terminated quasi-prepolymers.

Using the quasi-prepolymers in Examples 1–27 a series of carbodiimide foams were prepared by the following procedure.

To a suitable reaction vessel equipped with stirring means, heating means and thermometer was added an amine-derived isocyanate-terminated quasi - prepolymer. With stirring the catalyst was then added thereto and while continuing the stirring the mixture was heated to the desired initiating temperature. After the initiating temperature was reached a short period of induction elapsed and foam formation began as evidenced by the evolution of carbon dioxide and the formation of a foam in the vessel.

The catalyst employed in the preparation of the foam was a blend of either (1) a 1:1 weight mixture of 2,4,6-tris(diethanolamine)-s-triazine and 1,3,5-tris(dimethyl-3-aminopropyl)-s-hexahydrotriazine, a co-catalyst system as described in copending U.S. Ser. No. 157,025, or (2) a mixture of 2,4,6-tris(methylethanolamino) - s - triazine and 1,3,5 - tris(dimethyl-3-aminopropyl)-s-hexahydrotriazine, a co-catalyst system described in copending U.S. Ser. No. 169,470. These are respectively referred to hereinafter as catalyst 1 and catalyst 2.

Surfactants and plasticizers, where used, were pre-blended with the catalyst prior to the catalyst addition to facilitate their introduction.

Table II, below, sets forth the ingredients and amounts thereof used to prepare the foams as well as the initiating temperature of the reaction.

TABLE II.—CARBODIIMIDE FOAM FORMULATION

| Example | Quasi-preploymer | | Catalyst | | Plasticizer amt., p.b.w.[a] | Surfactant amt., p.b.w.[b] | Initiating temperature, °C. |
|---|---|---|---|---|---|---|---|
| | Type | Amt., p.b.w. | Type | Amt., p.b.w. | | | |
| 41 | Ex. 1 | 101 | 1 | 4 | 5.0 | 0.5 | 45 |
| 42 | Ex. 2 | 102 | 1 | 4 | 5.0 | 0.5 | 55 |
| 43 | Ex. 3 | 102 | 1 | 6 | 5.0 | 0.5 | 45 |
| 44 | Ex. 4 | 101 | 1 | 6 | 5.0 | 0.5 | 60 |
| 45 | Ex. 5 | 102 | 1 | 6 | 5.0 | 0.5 | 60 |
| 46 | Ex. 6 | 105 | 1 | 6 | 5.0 | 0.5 | 45 |
| 47 | Ex. 7 | 101 | 2 | 4 | 5.0 | 0.5 | 45 |
| 48 | Ex. 8 | 102 | 2 | 3 | 5.0 | 0.5 | 45 |
| 49 | Ex. 9 | 105 | 2 | [d]3 | 5.0 | 0.5 | 60 |
| 50 | Ex. 10 | 101 | 2 | [c]2 | 5.0 | 0.5 | 25 |
| 51 | Ex. 11 | 102 | 2 | [c]2 | 5.0 | 0.5 | 40 |
| 52 | Ex. 12 | 105 | 2 | [c]2 | 2.0 | 0.5 | 40 |
| 53 | Ex. 13 | 101 | 2 | [c]2 | 5.0 | 0.5 | 45 |
| 54 | Ex. 14 | 102 | 2 | [c]2 | 5.0 | 0.5 | 40 |
| 55 | Ex. 15 | 105 | 2 | [c]4 | 5.0 | 0.5 | 60 |
| 56 | Ex. 16 | 101 | 2 | [d]3 | 5.0 | 0.5 | 60 |
| 57 | Ex. 17 | 102 | 2 | [e]2.5 | 5.0 | 0.5 | 20 |
| 58 | Ex. 18 | 105 | 2 | [e]2.5 | 5.0 | 0.5 | 45 |
| 59 | Ex. 19 | 101 | 2 | [c]4 | 5.0 | 0.5 | 100 |
| 60 | Ex. 20 | 102 | 2 | [e]2.5 | 5.0 | 0.5 | 80 |
| 61 | Ex. 21 | 105 | 2 | [f]4 | 5.0 | 0.5 | 100 |
| 62 | Ex. 22 | 101 | 2 | [c]2 | 5.0 | 0.5 | 60 |
| 63 | Ex. 23 | 102 | 2 | [e]2.5 | 5.0 | 0.5 | 60 |
| 64 | Ex. 24 | 105 | 2 | [c]3 | 5.0 | 0.5 | 80 |
| 65 | Ex. 25 | 101 | 2 | [c]4 | 5.0 | 0.5 | 100 |
| 66 | Ex. 26 | 102 | 2 | [d]3 | 5.0 | 0.5 | 100 |
| 67 | Ex. 27 | 105 | 2 | [e]2.5 | 5.0 | 0.5 | 100 |

[a] Tris(2-chloroethyl)phosphate.
[b] A polysiloxane surfactant sold by Dow Corning under the name DC-193.
[c] A 1:1 weight mixture of triazine to hexahydrotriazine.
[d] A 2:1 weight mixture of triazine to hexahydrotriazine.
[e] A 3:2 weight mixture of triazine to hexahydrotriazine.
[f] A 3:1 weight mixture of triazine to hexahydrotriazine.

EXAMPLES 68–80

The amine-derived isocyanate-terminated quasi-prepolymers of Examples 28–40 were utilized to prepare carbodiimide foams following substantially the same procedure as in Examples 41–67. However, in the preparation of these foams a fluorocarbon blowing agent was dissolved in the quasi-prepolymer prior to the introduction of the catalyst thereinto. Also, these foams were initiated at room temperature. Again, plasticizer and surfactant were preblended with the catalyst to facilitate their introduction and the catalyst was catalyst 2 described above in a 2:1 weight mixture of triazine to hexahydrotriazine.

Table III, below sets forth the ingredients and amounts used to prepare these foams.

From this data it can be seen that these foams exhibit excellent properties.

Having thus described the invention, what it is desired to claim and secure by Letters Patent is:

1. A rigid cellular foam characterized by carbodiimide linkages, the foam further including isocyanurate and isocyanate groups and having minor amounts of urea and biuret groups present therein prepared by the catalytic condensation of an isocyanate-terminated quasi-prepolymer containing from about 20% to 40% by weight of free isocyanate groups obtained by reacting at a temperature of from about 30° C. to 150° C. a stoichiometric excess of organic polyisocyanate with a primary or secondary aromatic or aliphatic polyamine.

2. The foam of claim 1 wherein the quasi-prepolymer is employed in an amount ranging from about 10 to 100 parts by weight thereof per part by weight of catalyst.

3. The foam of claim 1 wherein the quasi-prepolymer is employed in admixture with another organic polyisocyanate.

4. The foam of claim 1 wherein the polyamine is methylene dianiline.

TABLE III.—FOAM FORMULATION

| Example | Quasi-prepolymer Type | Amt., p.b.w. | Catalyst amt., p.b.w. | Plasticizer, amt., p.b.w.[a] | Surfactant amt., p.b.w.[b] | Blow. agt. amt., p.b.w.[c] |
|---|---|---|---|---|---|---|
| 68 | Ex. 28 | 103 | 2.7 | 1.2 | 0.6 | 10 |
| 69 | Ex. 29 | 101 | 2.7 | 1.2 | 0.6 | 10 |
| 70 | Ex. 30 | 102 | 2.7 | 1.2 | 0.6 | 10 |
| 71 | Ex. 31 | 103 | 2.7 | 1.2 | 0.6 | 10 |
| 72 | Ex. 32 | 101 | 2.7 | 1.2 | 0.6 | 10 |
| 73 | Ex. 33 | 102 | 2.7 | 1.2 | 0.6 | 10 |
| 74 | Ex. 34 | 103 | 2.7 | 1.2 | 0.6 | 10 |
| 75 | Ex. 35 | 101 | 2.7 | 1.2 | 0.6 | 10 |
| 76 | Ex. 36 | 102 | 2.7 | 1.2 | 0.6 | 10 |
| 77 | Ex. 37 | 103 | 2.7 | 1.2 | 0.6 | 10 |
| 78 | Ex. 38 | 101 | 2.7 | 1.2 | 0.6 | 10 |
| 79 | Ex. 39 | 102 | 2.7 | 1.2 | 0.6 | 10 |
| 80 | Ex. 40 | 103 | 2.7 | 1.2 | 0.6 | 10 |

[a] Tris(2-chloroethyl)phosphate.
[b] A polysiloxane surfactant sold by Dow Corning under the name DC-193.
[c] 1,1,2-trichloro-1,2,2-trifluoroethane.

EXAMPLE 81

The foams of Examples 68–80 were tested for physical properties and flame characteristics using the following procedures:

(1) Compressive strength—ASTM 1621
(2) Friability—Faber friability
(3) Flame properties—Butler chimney test as described by Krueger et al. SPE 25th Antec, v. XIII, Detroit, Mich. 1967, p. 1052–1057

Table IV, below, tabulates these results.

TABLE IV

| Example | Density, p.c.f. | Closed cell content, percent | Compressive strength, p.s.i., 10% deflection | Butler chimney test Faber friability, cycl./in. | Weight ret., percent | Flame ht., in. | Smoke |
|---|---|---|---|---|---|---|---|
| 68 | 2.52 | 61 | 20 | 49 | 95 | 6 | Medium. |
| 69 | 2.64 | 10 | 34 | 112 | 97 | 4 | Light. |
| 70 | 2.29 | 53 | 34 | 147 | 97 | 4 | Do. |
| 71 | 2.94 | 94 | 47 | ---- | 96 | 6 | Do. |
| 72 | 3.65 | 10 | 60 | 167 | 96 | 4 | Do. |
| 73 | 3.33 | 95 | 50 | 140 | 97 | 4 | Do. |
| 74 | 3.44 | 96 | 58 | 242 | 97 | 4 | Do. |
| 75 | 3.31 | 95 | 48 | 219 | 97 | 3 | Do. |
| 76 | 3.75 | 94 | 65 | 205 | 98 | 3 | Do. |
| 77 | 3.82 | 94 | 64 | 231 | 98 | 4 | Do. |
| 78 | 3.77 | 97 | 72 | 258 | 98 | 4 | Do. |
| 79 | 4.51 | 97 | 95 | ---- | 98 | 4 | Do. |
| 80 | 4.95 | 94 | 99 | ---- | 98 | 4 | Do. |

5. The foam of claim 1 wherein the polyamine is hexamethylene diamine.

References Cited
UNITED STATES PATENTS

| | | | |
|---|---|---|---|
| 3,591,560 | 7/1971 | Wagner | 260—2.5 AT |
| 3,441,588 | 4/1969 | Wagner | 260—2.5 AT |
| 3,367,956 | 2/1968 | Hennig | 260—2.5 AT |
| 3,350,438 | 10/1967 | Hennig | 260—2.5 AT |
| 3,284,479 | 11/1966 | Windemuth | 260—2.5 AT |
| 3,124,605 | 3/1964 | Wagner | 260—2.5 AT |
| 3,645,923 | 2/1972 | Kan | 260—2.5 BF |
| 3,634,345 | 1/1972 | Diehr | 260—2.5 AW |
| 3,657,161 | 4/1972 | Bernard | 260—2.5 AW |
| 3,640,966 | 2/1972 | Hennig | 260—2.5 AT |
| 3,620,986 | 11/1971 | Diehr | 260—2.5 BF |
| 3,580,868 | 5/1971 | Diehr | 260—2.5 BF |
| 3,517,039 | 6/1970 | Wagner | 260—2.5 AT |
| 3,462,470 | 8/1969 | Emery | 260—77.5 AT |

DONALD E. SZAJA, Primary Examiner

C. W. IVY, Assistant Examiner

U.S. Cl. X.R.

260—2.5 AW, 2.5 AT, 2.5 AM, 77.5 NC